Timing Sequence

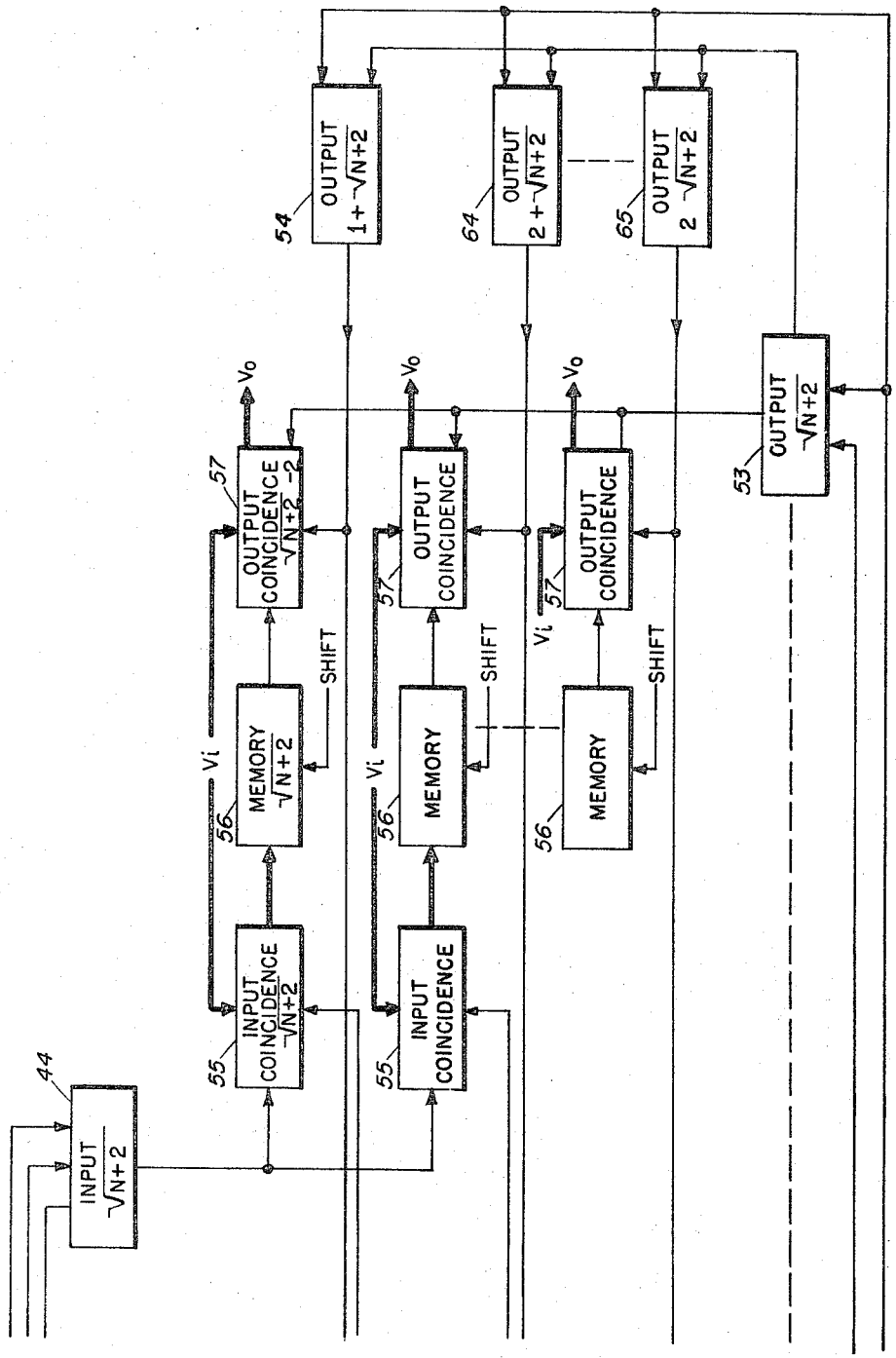

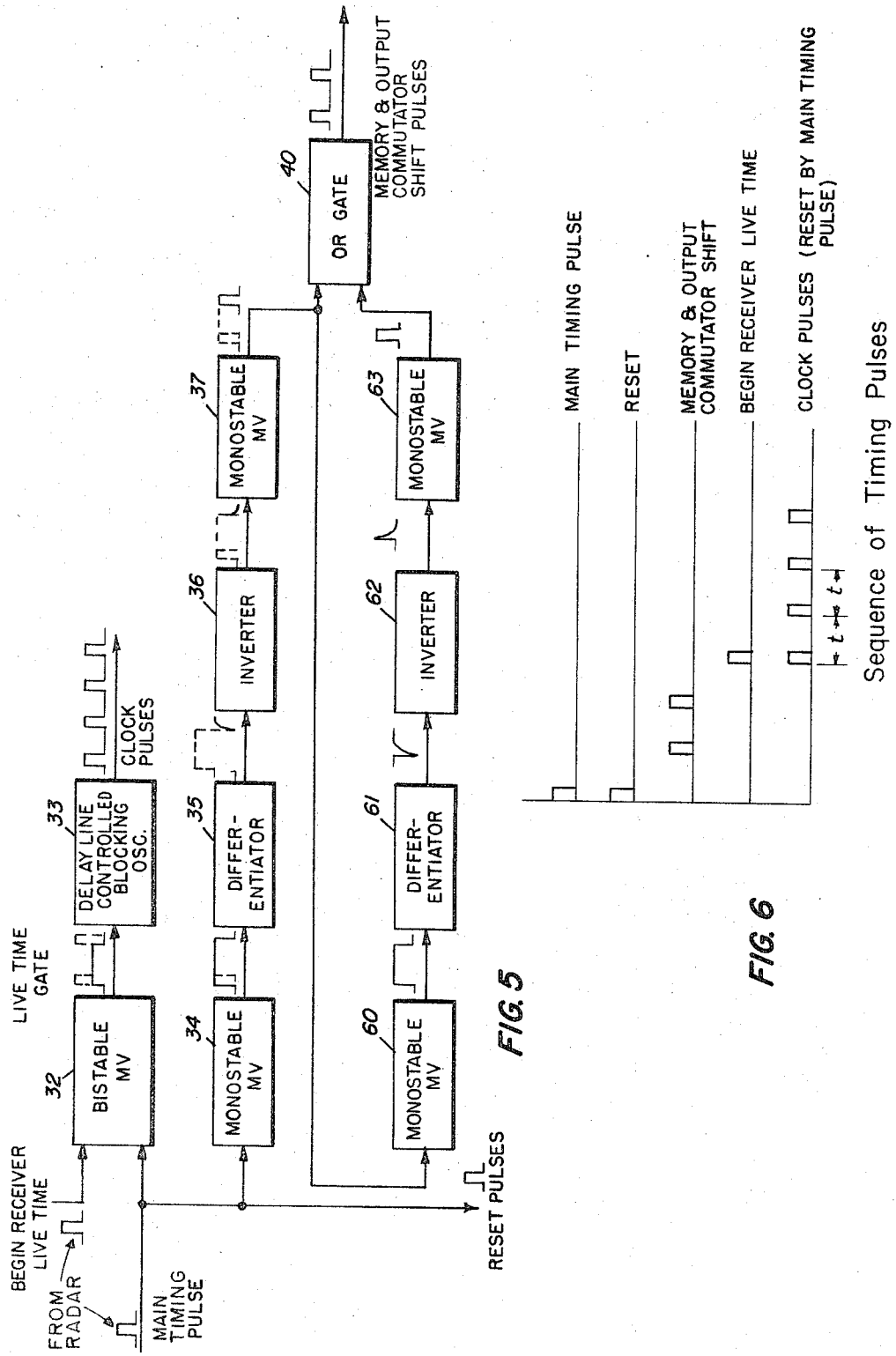

United States Patent Office 3,307,184
Patented Feb. 28, 1967

3,307,184
DIGITAL VIDEO CORRELATOR
James L. Poterack, El Paso, Tex., and Joseph P. Mefford, Bellerose, N.Y., assignors, by mesne assignments, to the United States of America as represented by the Secretary of the Navy
Filed Oct. 27, 1964, Ser. No. 406,947
7 Claims. (Cl. 343—17.1)

This invention relates in general to radar receivers and in particular to radar receivers capable of functioning usefully in the presence of high repetition rate interference and jamming.

One of the problems commonly encountered with radar systems is that of distinguishing target return signals from interference signals. Radar interference generally falls into two categories: random interference and pulsed interference. The random interference, which may be due to receiver noise or atmospheric phenomena, has no ascertainable period of occurrence. The pulsed type of interference, frequently caused by enemy jamming in a military environment, typically has a high repetition rate at or near the repetition rate of the radar system. Although the presence of either type of interference will degrade the operation of a radar system, the presence of pulsed interference of a high repetition rate is especially troublesome to a radar system designed to lock onto and track a particular target. In the case of a visual presentation, such as a PPI scan, the presence of interference can render the identification and selection of the desired target signal difficult or impossible.

It is highly unlikely that a radar would lock onto and track a pulsed interference signal rather than a true target signal, unless by some small chance the pulsed repetition frequency of both the offending and the offended radars happened to be the same. In such a case, the present invention would not afford any protection against the offending similar pulsed repetition frequency.

However, the pulsed repetition frequency of the pulsed interference would, almost without exception, be different from the pulsed repetition frequency of the protected radar employing the present invention. In this case, then, the correlator forming the invention woud accomplish the following:

(1) The target display would be enhanced in all modes of operation due to reduction of unsynchronized background pulses.

(2) The time required to lock-on a target is reduced due to enhancement of the displayed target and the reduction of erroneous information that enters the tracking circuitry.

(3) Track gate jitter and antenna jitter is reduced, during the tracking operation, because the amount of erroneous information entering the tracking circuitry is reduced.

Another important feature of the present invention is that it will permit the protected radar to determine its own pulsed repetition frequency and to modulate this frequency in any manner. This feature makes the invention more generally useful than most prior art devices which are restricted to a constant pulsed repetition frequency which they must provide. Many military radars use a rapid pulsed repetition frequency diversity for various reasons and, therefore, cannot tolerate the restriction of a constant frequency imposed by the prior art devices. The digital video correlator making up the present invention was devised to provide the advantages of correlation without the subsequent disadvantages imposed by the prior devices.

According to this invention the problem of interference rejection is approached in the following manner: The period of the radar set is assumed to be divided into N intervals of time. There are N one-bit memory locations corresponding to these N intervals of time. Arrival of one pulse during a particular interval will be recorded in the corresponding memory location. The arrival of additional pulses during the same interval will not have any effect on a memory. A coincidence section will sample the information gathered by the memory section during the preceding period. The presence of information stored in a memory section during the preceding period will cause any video pulse occurring during the interval corresponding to this location to appear at the output.

Accordingly, an object of this invention is to provide a radar receiver that is relatively insensitive to pulsed interference.

Still another object of this invention is the provision of a radar receiver in which the time required to lock onto a target is considerably reduced and also the chance of pulsed interference breaking the tracking of the target is likewise reduced.

Yet another object is to provide a radar receiver in which pulsed interference is removed from the receiver output.

A still further object is the provision of a radar receiver in which the probability of detection of a target in the presence of pulsed interference is improved.

Other objects and advantages of the invention will hereinafter become more fully apparent from the following description of the annexed drawings which illustrate a preferred embodiment and wherein:

FIGS. 4a, 4b and 4c show a schematic representation of another embodiment of the invention;

FIG. 5 shows a schematic representation of a circuit which may be used to provide timing pulses for the embodiment of FIGS. 4a, 4b and 4c; and FIG. 6 shows the timing pulses required for the operation of the embodiment of FIGS. 4a, 4b and 4c.

Figure 1:
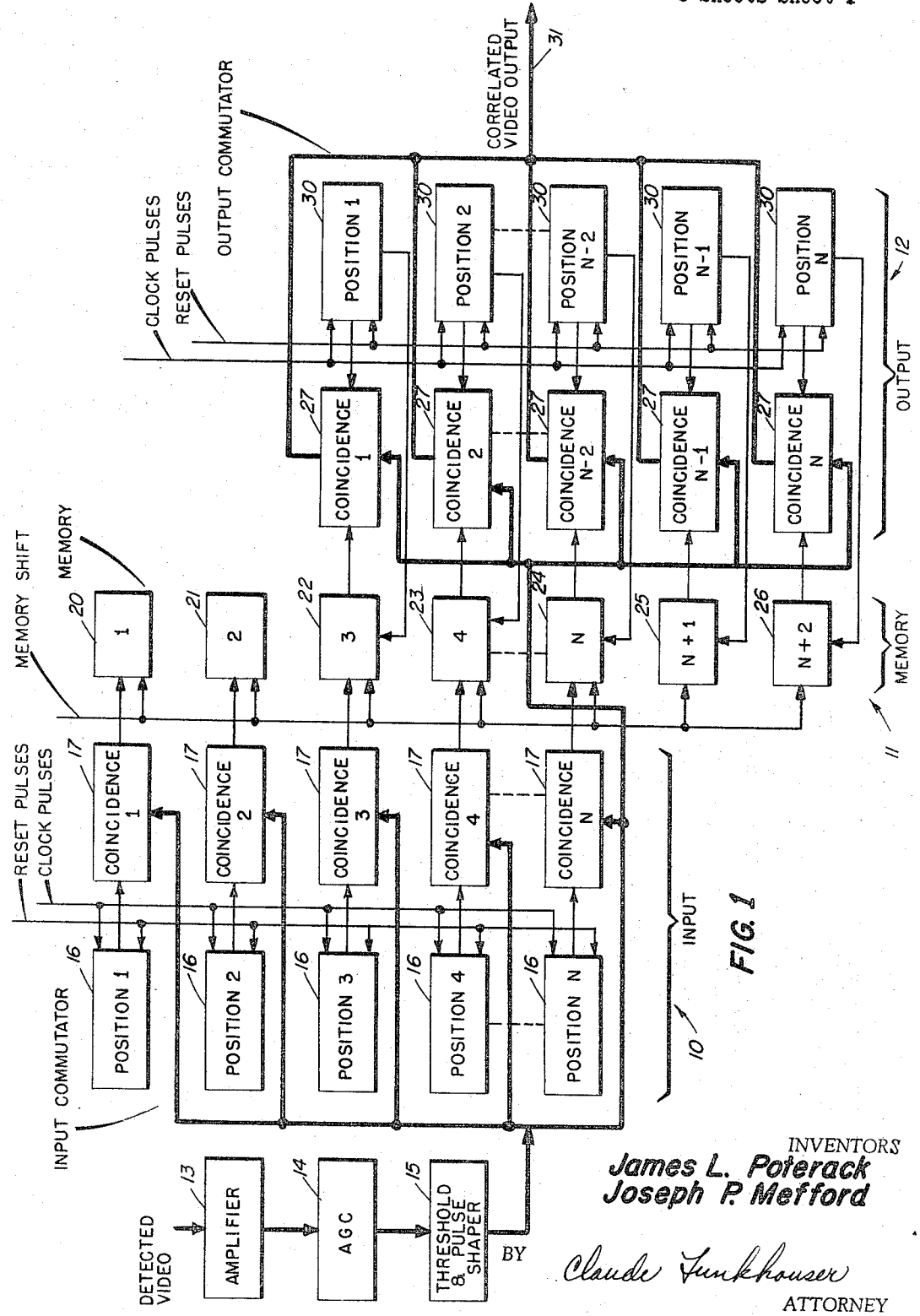
FIG. 1 shows a schematic representation of one embodiment of the invention.

Referring now to FIG. 1, it will be seen that the invention consists broadly of an input section 10, a memory section 11 and an output section 12. Video signals from the radar receiver are passed through amplifier 13, automatic gain control 14 and threshold circuit and pulse shaper 15 whereby the pulses that are delivered to input section 10 are of the correct voltage and width.

Input section 10 includes an input commutator consisting of N flip-flop circuits 16 arranged as a ring counter. Each flip-flop can exhibit one of two voltage conditions at its output, which conditions may be represented, respectively, as a "one" or a "zero." Each of the flip-flops 16 is supplied with clock pulses and with reset pulses whereby the ring counter can be advanced or reset to start position.

The output of each of flip-flops 16 is connected to one of the inputs of a corresponding coincidence circuit 17. Thus it is seen that there are N coincidence circuits corresponding to the N flip-flops of the input commutator. Each of these coincidence circuits is also provided with an input consisting of video pulses. The output of any of coincidence circuits 17 will be present only upon simultaneous occurrence of a video pulse and an input pulse from a corresponding input commutator position; this output consists of a pulse which is passed on to a corresponding memory section. The presence of an output from one of the coincidence circuits may be considered as a "one" and the absence of such output as a "zero."

Memory section 11 contains $N+2$ one-bit memory locations. The memory is a serial shift made up of flip-flop circuits whereby each memory section can remember either the presence ("one") or the absence ("zero") of an input signal. Before the start of the next radar system period the information in the memory section is advanced two positions by the receipt of memory shift pulses whereby memory positions 1 and 2 will be cleared to receive new information. That is, the information formerly stored in position 1 is advanced to position 3 and positions 1 and 2 are reset to "zero" or no input. The $N+2$ memory locations are designated on FIG. 1 as elements 20 to 26.

Output section 12 includes N coincidence circuits 27 each of which receives as an input the information stored in a corresponding one of the memory locations. The first coincidence circuit receives the output from memory location 3 because of the above mentioned two-position memory shift. Each of the coincidence circuits 27 also receives as inputs detected video pulses and a control pulse from an output commutator. This output commutator is a ring counter consisting of N flip-flop circuits, as is the input commutator, and it is reset and pulsed in the same manner as the input commutator by the same pulses. A detected video signal will be passed through a certain one of coincidence circuits 27 only if that circuit receives at the same time a signal stored in the corresponding memory location and a "one" signal from the corresponding one of output commutator flip-flop circuits 30. The outputs of the several coincidence circuits 27 are connected together to form a correlated video output 31 which is passed on to radar system utilization means.

The operation of the embodiment of FIG. 1 will now be explained. As mentioned earlier, the period of the radar track is assumed to be divided into N intervals of time each of duration $t$. The arrival of a received pulse, whether a desired target return signal or an undesired interference signal, during a particular interval will cause the corresponding memory location to assume the condition "one." That is, the memory location will record the fact of occurrence of at least one received signal during the interval. This will be accomplished in sequence for each of intervals 1 through N for a given period. In the next following period, the arrival of a signal during a given interval is compared with the state of the memory location for that interval. If that memory location contains a "one," indicating that a signal had been received during the corresponding interval of the preceding period, then the pulse received during the present period will be passed on to form the correlated video output.

Input commutator functions as a cyclical switch to select in sequence the memory locations ranging from 1 to N. This input commutator, which is made up of N flip-flop circuits arranged as a ring counter, can provide a "one" output at only one of its positions at any given time. At the beginning of a receiver period the reset pulse shifts the input commutator flip-flops in parallel to position N whereby only the N flip-flop has an output. The N position flip-flop thus exhibits condition "one" while the rest of the flip-flops exhibit condition "zero." Upon receipt of the first clock pulse the condition "one" appears at position 1 of the input commutator and all other positions are "zero." Receipt of the second clock pulse causes the condition "one" to shift to position 2 of the input commutator and so on through the series of N clock pulses.

Figure 2:
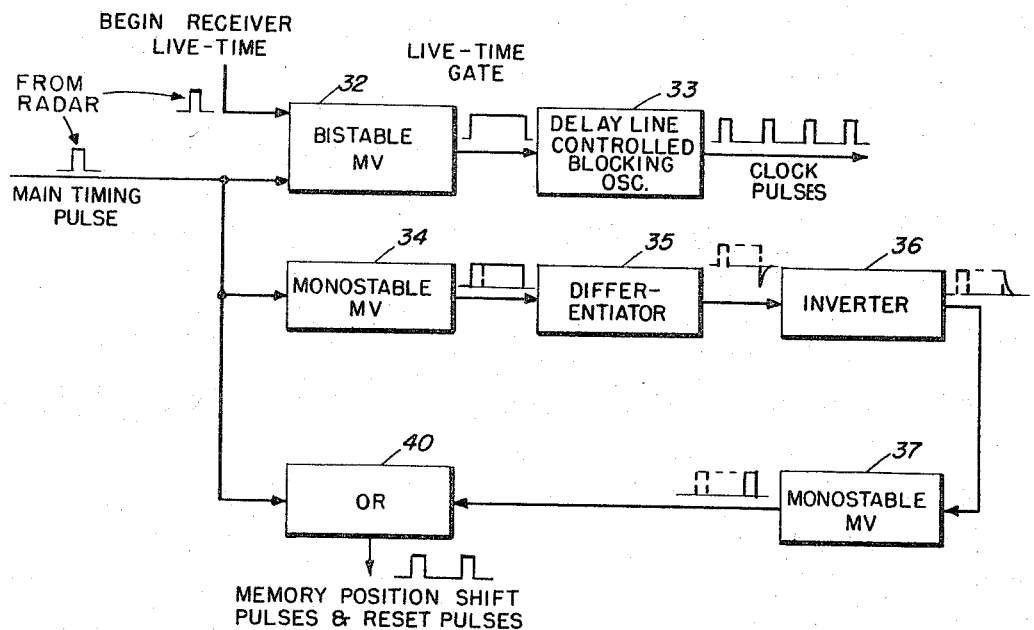
FIG. 2 shows a schematic representation of a circuit which may be used to provide timing pulses for the embodiment of FIG. 1.

The time relationship between the reset pulse and the clock pulses can be seen by referring to FIG. 2. The beginning of the radar system period is marked by the receipt from the radar system control oscillator of a timing pulse. As will be explained subsequently, this causes the occurrence of the reset and shift pulses. The clock pulse sequence begins with the reception of a pulse at the beginning of the radar receiver live-type.

As each of the positions of the input commutator exhibits a "one" output in sequence the corresponding coincidence circuit 17 is enabled to pass on an output to the corresponding memory position. Thus, as each of the coincidence circuits is actuated in sequence by the input commutator a pulse will be passed on to the corresponding memory circuit if at least one video pulse has also been present during that interval. The information stored in the memory will be advanced two places by the reception of two shift pulses. This clears memory positions 1 and 2 so that any information received during the first two intervals of this second period can be stored in the memory. Because of this memory shift the information previously stored in positions $N-1$ and N of the memory is now stored in memory location $N+1$ and $N+2$, respectively.

Each of the output coincidence circuits 27 has two control inputs and a signal input. A signal applied to the signal input will be passed to the output of the coincidence circuit only if control signals are concurrently present at each of the control inputs. One of these control signals is supplied by the output commutator which functions in the same manner as and in step with the input commutator, previously described. For example, during the first interval, coincidence circuit 1 as so designated in FIG. 1 will receive one control signal from output commutator position 1. Coincidence circuit 1 may also receive from memory position 3 a control signal depending upon whether or not a video pulse was received during the corresponding interval of the preceding period. If such a signal was received, then coincidence circuit 1 will permit passage during the present interval of any video pulses received during this interval of this period. At the end of the first interval the output commutator will be switched by a clock pulse to the second interval whereat the above functions will be repeated. This will be done in sequence for each of the N positions corresponding to the N intervals. It will be seen that in any period there will be a video output only if there is correlation between a video signal received in a given interval and the occurrence of a video signal received during the same interval of the immediately preceding period.

Each of memory positions 3 through $N+2$ will be reset to "zero" by a signal received from the corresponding output commutator position 1 through N. The reset signal for a given interval will occur as the output commutator switches to the next position in the sequence of operation. As mentioned earlier, memory positions 1 and 2 are reset to "zero" at the beginning of each period.

Figure 3:
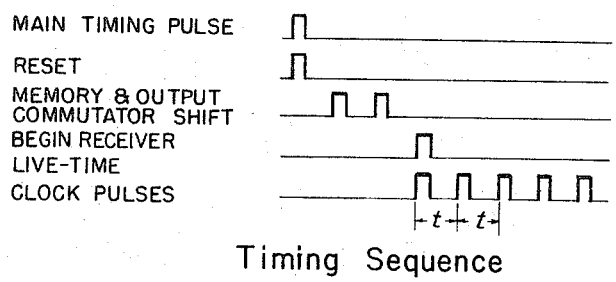
FIG. 3 shows the timing pulses required for the operation of the embodiment of FIG. 1.

A circuit for providing the operating pulses shown in FIG. 3 is set forth in FIG. 2. Reception of a signal from the radar system signifying the beginning of the receiver live-time cause bistable multivibrator 32 to gate on a blocking oscillator 33. The output of this oscillator consists of clock pulses having a pulse repetition period of $t$. The live-time gate is terminated by the reception of a main timing pulse which also signifies the beginning of the next period. This main timing pulse is also applied to monostable multivibrator 34. The trailing edge of the output pulse of multivibrator 34 is differentiated in differentiator 35 and inverted in inverter 36. The pulse thus formed triggers monostable multivibrator 37 to provide an output pulse that is supplied to OR gate 40. This OR gate is also directly supplied with the main timing pulses. The two output pulses per period of the OR circuit thus furnish the commutator reset pulse and the memory shift pulses. As shown in FIG. 3, commutator reset and the memory shift occur before the beginning of the first clock pulse.

Figure 4A:
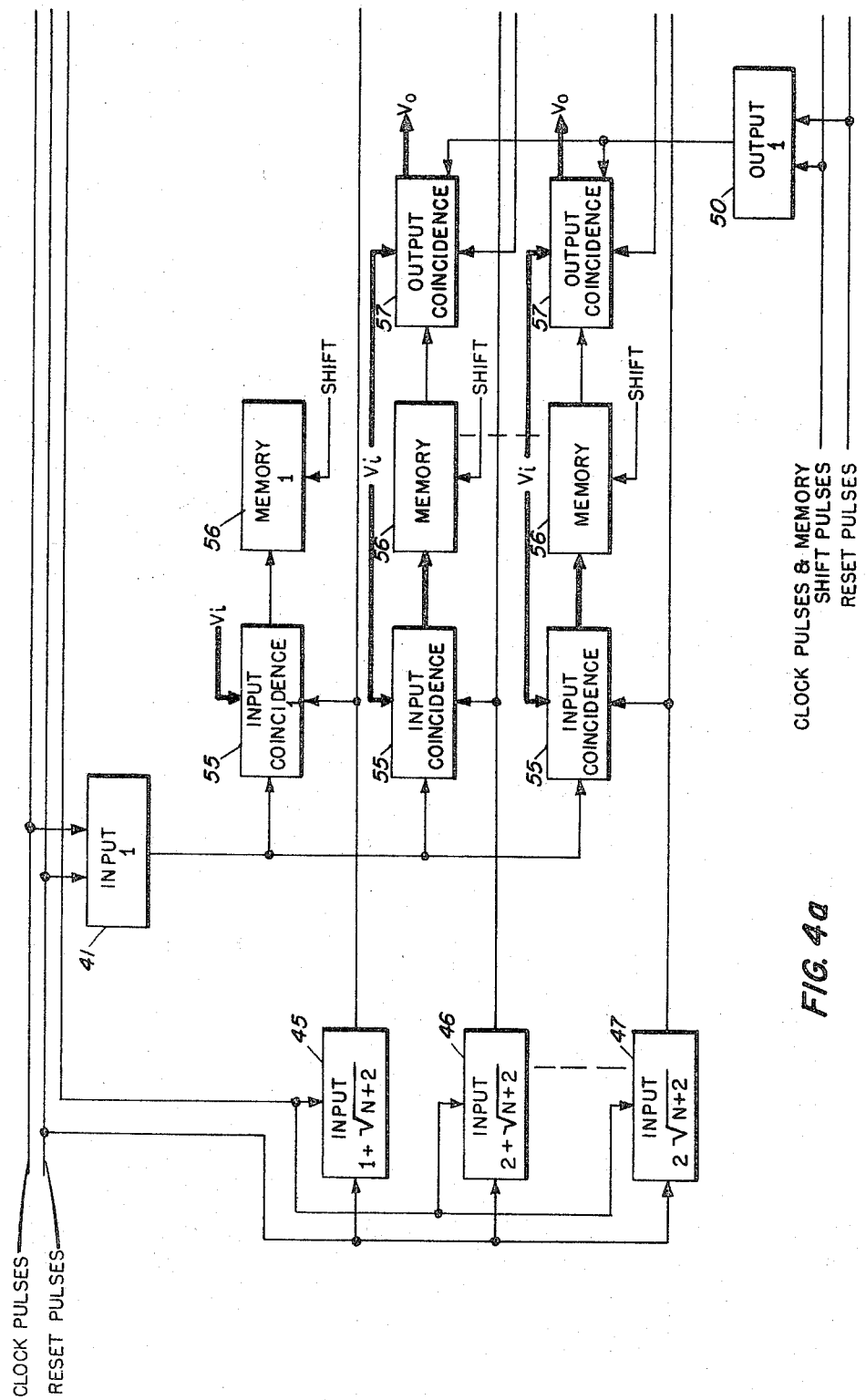
Figure 4B:
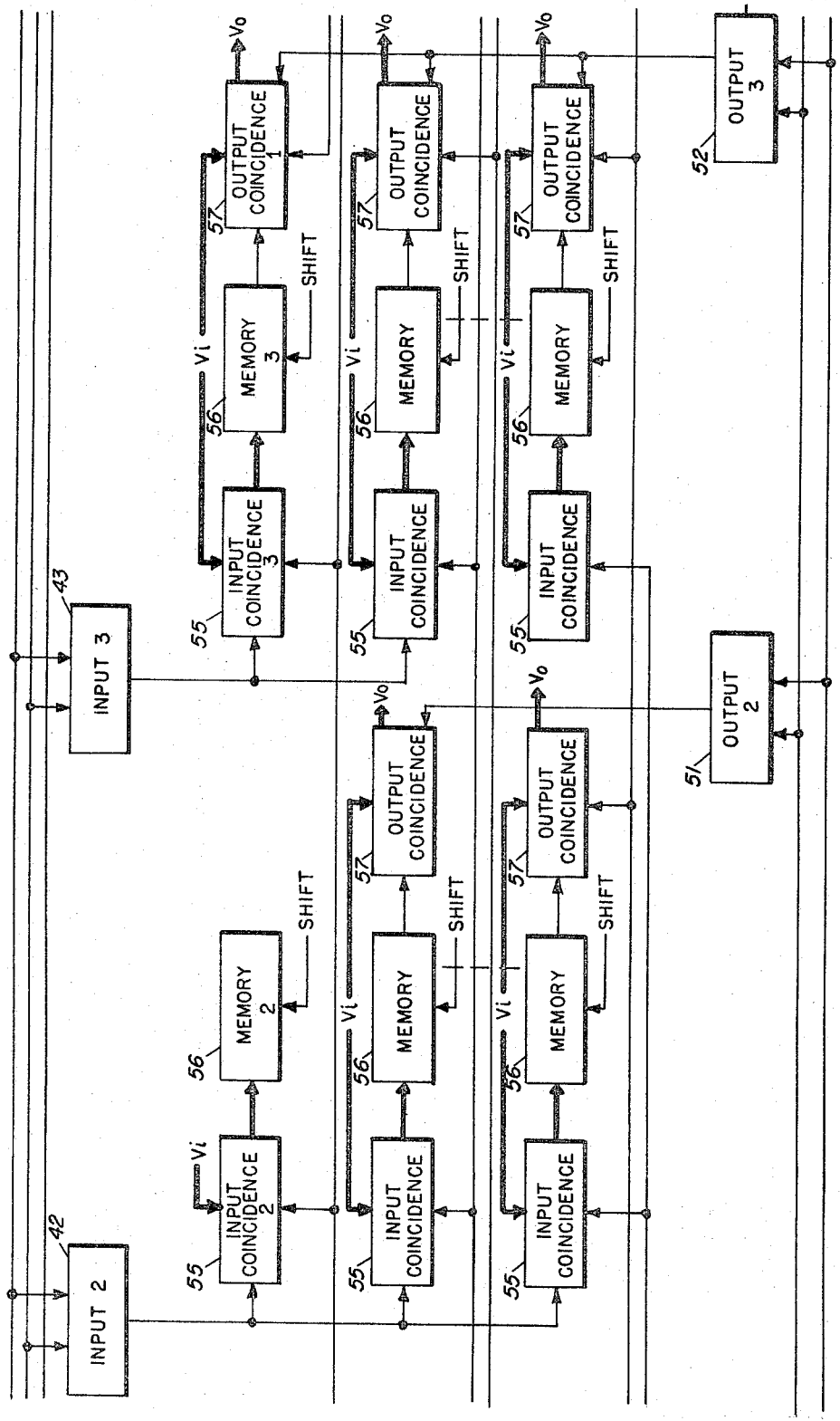

The basic configuration of this invention has been described with reference to FIG. 1 while FIGS. 4a, 4b and 4c show another embodiment of the invention which requires fewer components. Again the period of the radar set is considered to be divided into N intervals of time for which as described above $N+2$ memory locations are required according to this invention. In the embodiment of FIGS. 4a, 4b and 4c these $N+2$ memory locations along with their associated input coincidence circuits and output coincidence circuits have been rearranged to form a square matrix having $\sqrt{N+2}$ memory locations per matrix side. This arrangement reduces the number of input and output commutator positions to $2\sqrt{N+2}$ for each of the commutators. Of course, $N+2$ must be a perfect square. For example, if $N+2$ equals 100, the number of commutator flip-flops can be reduced to 20 for each of the input and output commutators.

Each of the matrix segments except as noted below consists of an input coincidence circuit 55, memory position 56 and an output coincidence circuit 57. These components function in the same manner as their counterparts in the embodiment of FIG. 1. No output coincidence circuit is provided for matrix positions 1 and 2, since the memory shift function prevents the reading of any information from these two positions.

The topmost row of the matrix contains memory locations 1 through $\sqrt{N+2}$. The second matrix row will contain memory locations ranging from $1+\sqrt{N+2}$ through $2\sqrt{N+2}$. The remaining matrix rows are similarly arranged, the final position of the bottommost row containing memory location $N+2$.

The input commutator consists of a top row of flip-flop circuits 41, 42, 43 and 44 and a side row of flip-flop circuits 45, 46 and 47. Of course, each of these rows contain $\sqrt{N+2}$ flip-flop circuits. Assuming that the input commutator has been reset by an appropriate reset pulse, reception of the first clock pulse causes input position 1, shown by element 41, to exhibit a "one" output. All of the remaining top row input commutator positions exhibiting a "zero" output. Reception of further clock pulses will cause the "one" output to be stepped through input commutator position 2, 3, etc. to position $\sqrt{N+2}$ shown by flip-flop 44. During this phase of the commutator operation the first of the side row input commutator flip-flops 45 has constantly exhibited a "one" output and the remainder of the side row input commuator flip-flops have exhibited a "zero" output. After $\sqrt{N+2}$ clock pulses have been received the "one" condition of the input commuator top row returns to input position 1 shown again by flip-flop 41, and the "one" condition of the input commuator side row shifts to the second side row position shown by flip-flop 46. Additional clock pulses will cause the second row of the matrix to be scanned by the "one" condition after which the side row of the input flip-flop will shift to position 3, and so on.

Each of the input coincidence circuits 55 has one input connected to receive detected video pulses and two additional inputs connected to receive, respectively, signals from the top row and the side row of the input commutator. There must be coincidence of a "one" condition received from a flip-flop in each of the top row and side row of the input commutator, in addition to a detected video signal, to effect a memory position. The input commutator thus acts as a modified ring counter to provide selection of each of the memory locations in sequence from location 1 through location $N+2$.

Memory shift is accomplished as described with respect to the embodiment of FIG. 1. Immediately prior to the beginning of a new receive period the memory is shifted two locations so that the information formerly stored in location 1 now is stored in location 3, thus leaving locations 1 and 2 cleared to receive new information.

The output commutator occupies the remaining two sides of the matrix as shown in FIG. 4. The output commutator consists of a bottom row of flip-flop circuits 50, 51, 52 and 53 and a side row of flip-flop circuits 54, 64 and 65. Each of the bottom and side rows of the output commutator has $\sqrt{N+2}$ flip-flop circuits. At the beginning of the period the output commutator will be reset by the reset pulse as explained earlier. Since no information is to be read out of the first two matrix positions the bottom row of the output commutator must be shifted to position 3. At the beginning of the period the bottom row of the output commutator will be shifted two positions, after being reset, from position $\sqrt{N+2}$ to position 2. This two-position shift is accomplished by the same pulses which cause the two-position shift of the memory prior to the beginning of the clock pulses. The first clock pulse then shifts the bottom row of the output commutator to position 3 whereby flip-flop 52 will exhibit a "one" output and all other flip-flops on the bottom row will exhibit a "zero" output. Subsequent clock pulses will cause the "one" output of the bottom row to move in sequence to the $\sqrt{N+2}$ bottom row commutator position. The next clock pulse will cause the bottom row "one" output to shift back to position 1 and will cause the "one" output of the side row of the output commutator to shift from its first position, shown by flip-flop 54, to its second position as shown by flip-flop 64. It will be seen that the output commutator scans all segments of the matrix excepting the first and second position in a manner similar to that of the input commutator.

Each of the output coincidence circuits 57 has three control inputs and one signal input, the signal input receiving any detected video signals. A given output coincidence circuit, for example that of matrix position 3, is selected by the presence of a "one" output from an appropriate flip-flop circuit in each of the bottom and side rows of the output commutator. The output coincidence circuit so selected will then permit passage to its output of any detected video signals presented to it at that time only if the presence of a "one" stored in the corresponding memory location indicates that a video signal had also been received during the corresponding time interval of the immediately preceding period. In this manner, the embodiment of FIG. 4 provides a correlation for each interval between a video signal detected during that interval and the presence or absence of a detected video signal during the corresponding interval of the last preceding period.

FIG. 6 shows the sequence of timing pulses required for operation of the embodiment of FIG. 4. A main timing pulse is provided by the arrival of the pulse from the radar system control oscillator. This main timing pulse also functions as a reset pulse to reset the flip-flops of the input and output commutators. Before the beginning of the clock pulses two pulses are applied to the memory and to the bottom row of the output commutator to cause a two position shift of each of these units. Reception of a signal indicating the beginning of the receiver live time causes the clock pulse output to begin, and while these can be as many as $N$ clock pulses it should be realized that the radar period can vary and the digital correlator will still function. The radar tells the correlator to start with the live time pulse and to stop with the main timing pulse. The pulse repetition period as shown in FIG. 6 is $t$.

FIG. 5 shows a circuit which may be used to produce the necessary timing pulses for the embodiment of FIG. 4. Clock pulses are produced with a blocking oscillator 33 controlled by a bistable multivibrator as described with respect to FIG. 2. Monostable multivibrator 34, differentiator 35, inverter 36, and monostable multivibrator 37 also function as described in FIG. 2. Additionally, so that the two pulses required for memory and output commutator shift may be produced, the output pulse from monostable multivibrator 37 is supplied to another monostable multivibrator 60 which produces an output of relatively long duration whose trailing edge is differentiated in differentiator 61. The output pulse of differentiator 61 is inverted by inverter 62 and this inverted pulse triggers monostable multivibrator 63. The output of monostable multivibrator 63, which is a pulse of the same height and duration as the pulse output of multivibrator 37, is passed to OR gate 40.

Each of the circuits of FIG. 1 and FIG. 4 described above effectively eliminates a high percentage of external interference and internal noise for the following reasons: The desired pulses representing some target object will occur at approximately the same range each period and should, therefore, occupy the same memory location each period; there will be coincidence as described above and all target pulses will appear at the output. Interference pulses and noise pulses do not represent the same ranges each period and they, therefore, may or may not occur during corresponding intervals from period to period; the probability of an interference pulse occurring at the output thus is low.

It should be understood, of course, that the foregoing disclosure relates to only the preferred embodiments of the invention and that numerous modifications or alterations may be made therein without departing from the spirit and scope of the invention as set forth in the appended claims.

What is claimed is:

1. In a radar receiver the improvement comprising:
    timing means defining a number N of consecutive and sequential intervals for each period of operation of the receiver;
    a memory means having at least N positions;
    input means actuated by the timing means, said input means serving to render receptive to the presence of an input signal a separate one of the storage means positions for each of the N intervals whereby for each interval in sequence there is recorded in a corresponding position of the storage means the presence or absence of an input signal occurring during that interval;
    output means actuated by the timing means in synchronization with said input means, said output means receiving the input signal and functioning to permit passage to the receiver output of any input signal occurring during an interval of a period only if the presence of an input signal for the corresponding interval of the last preceding period is shown by a signal from the appropriate position of the storage means.

2. In a radar receiver the improvement comprising:
    timing means defining a number N of consecutive and sequential intervals for each period of operation of the receiver;
    memory means containing a number of locations in excess of N, each location being capable of assuming either a first state corresponding to the absence of an input signal or a second state corresponding to the presence of an input signal, the output of each location being a function of its state;
    input coincidence means for each of N locations, each of the input coincidence means receiving video signals detected by the receiver and being capable of furnishing to its corresponding memory location an output signal indicative of the presence of a detected video signal;
    input switching means connected to and controlling each of the input coincidence means, the input switching means enabling each one of the input coincidence means, in sequence and consecutively, to furnish to its corresponding memory location a signal indicative of the presence of a detected video signal, the operation of the input switching means being responsive to the timing means;
    output coincidence means for each of N memory locations, each of the output coincidence means receiving a detected video signal and receiving the output from the corresponding memory location and being capable of passing a video signal only in the presence of an output from this corresponding memory location; and
    output switching means connected to and controlling each of the output coincidence means, the output switching means enabling each one of the output coincidence means, in sequence and consecutively, to pass to the receiver output any video signal present concurrently with the output from the appropriate memory location.

3. The invention as in claim 2, wherein the output signal of the input coincidence means that is the first in the sequence of operation is supplied to a first memory location, and the output signal of the coincidence means that is the last in the sequence of operation receives the output of a last memory location, whereby there is provided at least one memory location having no corresponding output coincidence means and at least one other memory location having no corresponding input coincidence means, and wherein the memory means is capable of undergoing at least one serial shift in which each memory location excepting the first such location assumes the state of the immediate preceding memory location and in which the first memory location assumes a first state, whereby information in the memory means relating to a period of receiver operation is shifted to enable an insertion into the memory means of information relating at least to the first interval of the next subsequent interval.

4. The invention as in claim 3 wherein at the start of a receive period, the memory means undergoes serial shifts equal in number to the number of memory locations in excess of N, and wherein each memory location is reset to the first state by a pulse from the output switching means when the output switching means switches control from the output coincidence means corresponding to that memory location to the output coincidence means corresponding to the next memory location.

5. The invention of claim 3, wherein the input switching means includes N flip-flops arranged to form a first ring counter and the output switching means includes N flip-flops arranged to form a second ring counter, each ring counter being capable of exhibiting a control pulse output at only one at a time of its flip-flops, the output of each of the input switching means flip-flops being received by a corresponding one of the input coincidence means, the output of each of the output switching means flip-flops being received by a corresponding one of the output coincidence means, each of the flip-flops of both ring counters receiving as outputs from the timing means a reset pulse at the beginning of a period of operation, to enable each ring counter to be reset so that the Nth flip-flop of each ring counter exhibits a control pulse output, and one clock pulse corresponding to each interval of a period of operation to enable both ring counters to exhibit an output pulse in sequence and in synchronization from the first flip-flops through the Nth flip-flops, whereby the input coincidence means and output coincidence means are enabled to control the flow of signals to and from the locations of the memory means.

6. The invention as in claim 3 wherein the memory locations and their associated input coincidence means and output coincidence means are arranged to form a square matrix, the input switching means being disposed along two transverse sides of the matrix and the output switching means being disposed along the remaining two sides of the matrix.

7. The invention as in claim 6 wherein there are M memory locations in excess of N, whereby the total number of memory locations equals $N+M$, and the square matrix has $\sqrt{N+M}$ rows of memory locations and their associated input coincidence circuits and output coincidence circuits on a side, the input switching means includes $2\sqrt{N+M}$ flip-flops disposed to form two groups of $\sqrt{N+M}$ flip-flops per group, both groups comprising a ring counter, each flip-flop in the first group corresponding to a row of a first side of the matrix and each flip-flop in the seocnd group corresponding to a row of a second side of the matrix transverse to the first side, the output of each flip-flop of both groups being received by all of the input coincidence means contained in the matrix row to which that flip-flop corresponds, whereby each input coincidence means receives a flip-flop output from each of the first and second groups, each of the two groups of flip-flops being capable of exhibiting a control pulse output at only one at a time of the flip-flops in the group, both groups of flip-flops receiving as an output from the timing means a reset pulse at the beginning of a period of operation to enable each group of flip-flops to be reset so that the $\sqrt{N+M}$ flip-flop in each group will exhibit a control pulse output, the first group of flip-flops receiving as an output from the timing means one clock pulse corresponding to each interval of a period, and the second group of flip-flops also receiving an output from the $\sqrt{N+M}$ flip-flop of the first group, so that the output pulse from the first group as controlled by the clock pulses will occur in sequence from the first flip-flop to the $\sqrt{N+M}$ flip-flop and will then return to the first flip-flop to reset the sequence, and the output pulse of the second group as controlled by the output received from the first group will occur in sequence from the first flip-flop to the $\sqrt{N+M}$ flip-flop, the output pulse of the second group advancing to the next flip-flop of that group in sequence upon completion of the $\sqrt{N+M}$ output pulse from the first group; the output switching means including $2\sqrt{N+M}$ flip-flops disposed to form a third group and a fourth group each having $\sqrt{N+M}$ flip-flops which comprise a second ring counter, each flip-flop in the third group corresponding to a row of said first side of the matrix and each flip-flop of the fourth group corresponding to a row of said second side of the matrix, the output of each flip-flop of both of the third and fourth groups being received by all of the output coincidence means contained in the matrix row to which that flip-flop corresponds whereby each output coincidence means receives a flip-flop output from each of the third and fourth groups, each of the third and fourth groups of flip-flops being capable of exhibiting a control pulse output at only one at a time of the flip-flops in the group, both of the third and fourth groups receiving as an output from the timing means the reset pulse at the beginning of a period of operation to enable each group of flip-flops to be reset so that the $\sqrt{N+M}$ flip-flops in each group will exhibit a control pulse output, the flip-flops of the first and third groups in sequence from the first flip-flop to the $\sqrt{N+M}$ flip-flop in each group corresponding to the same matrix row and the flip-flops of the second and fourth groups in sequence from the first flip-flop to the $\sqrt{N+M}$ flip-flop in each group corresponding to the same matrix row, the third group of flip-flops receiving as another output from the timing means M shift pulses and then a clock pulse corresponding to each interval of a period, the fourth group of flip-flops receiving an output from the $\sqrt{N+M}$ flip-flop of the third group, so that the output pulse from the third group as controlled by the shift and clock pulses will occur in sequence from the first flip-flop to the $\sqrt{N+M}$ flip-flop and will then return to the first flip-flop to repeat the sequence and the output pulse of the fourth group as controlled by the output received from the third group will occur in sequence from the first flip-flop to the $\sqrt{N+M}$ flip-flop, the output pulse of the fourth group advancing to the next flip-flop of that group in sequence upon completion of the $\sqrt{N+M}$ output pulses from the third group.

References Cited by the Examiner
UNITED STATES PATENTS 2,412,974  12/1946  Deloraine.

CHESTER L. JUSTUS, *Primary Examiner.*

RODNEY D. BENNETT, *Examiner.*